W. C. WEBSTER.
TRIPLE VALVE FOR AIR BRAKES.
APPLICATION FILED MAY 29, 1914.
1,257,055.
Patented Feb. 19, 1918.
8 SHEETS—SHEET 6.
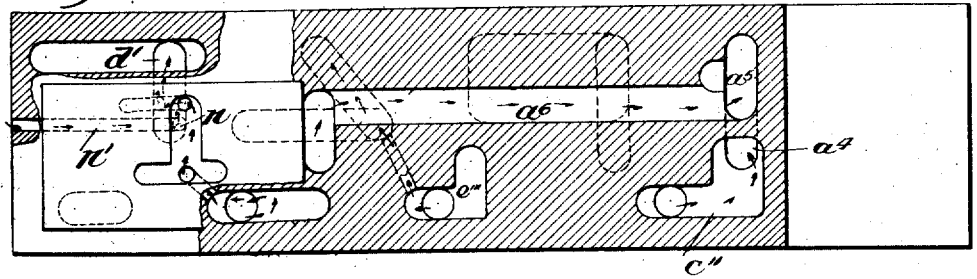
*Quick Service*
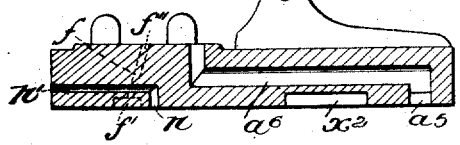
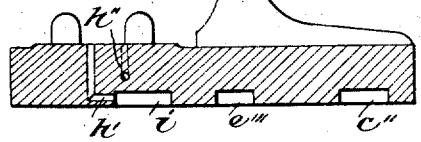
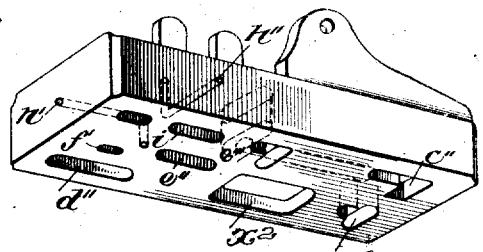
Witnesses
Inventor
W. C. Webster
By
Attorneys

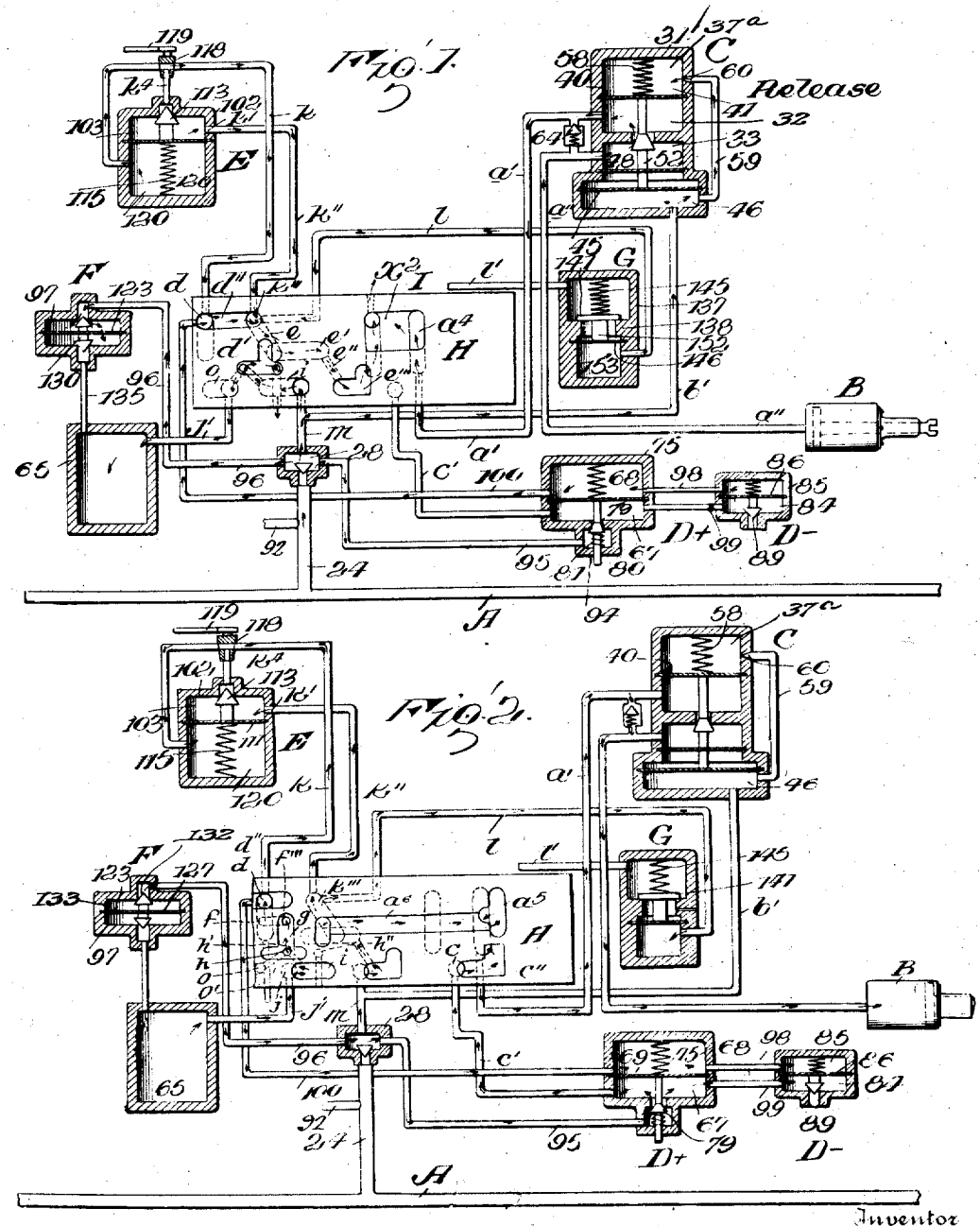

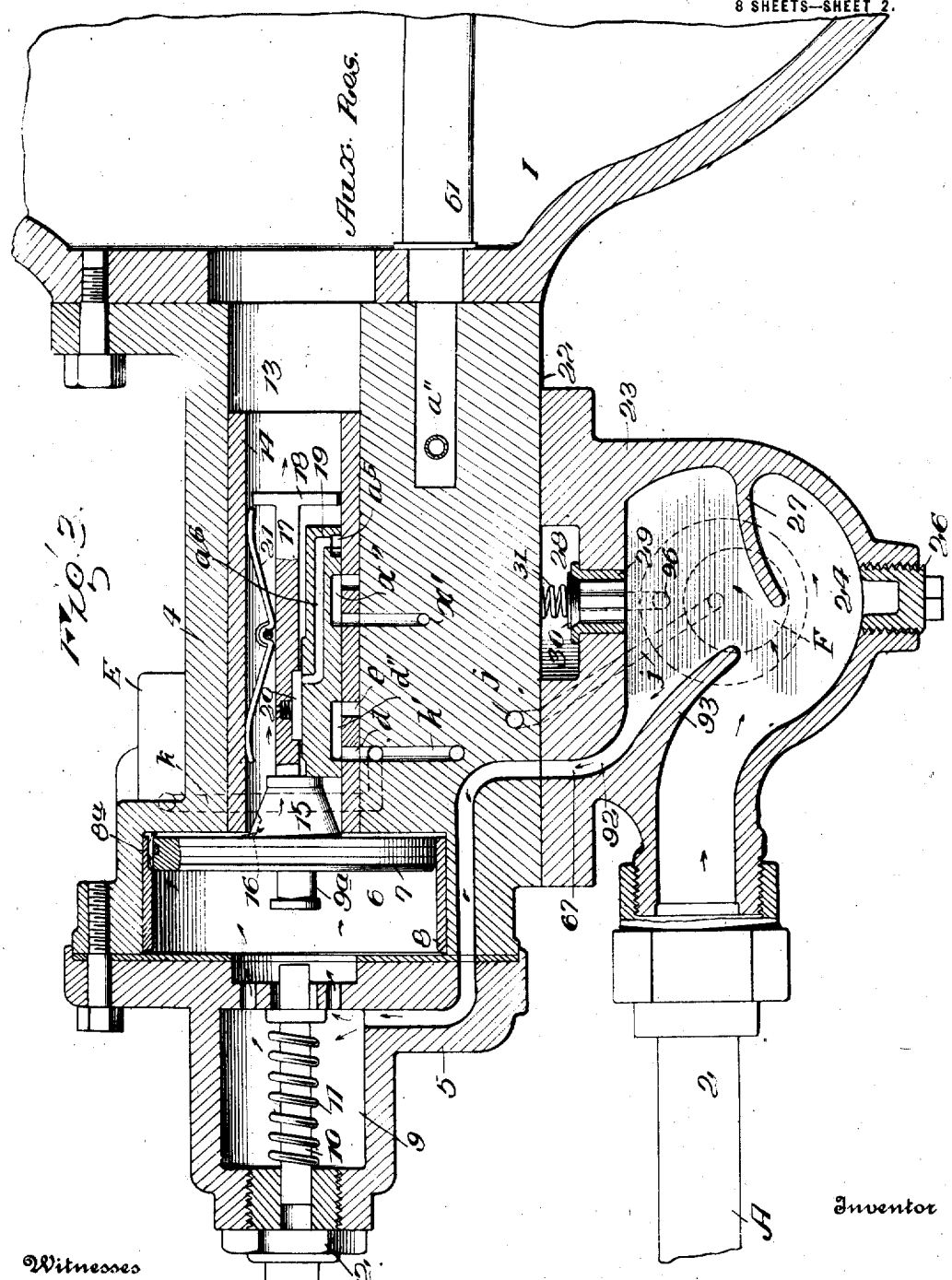

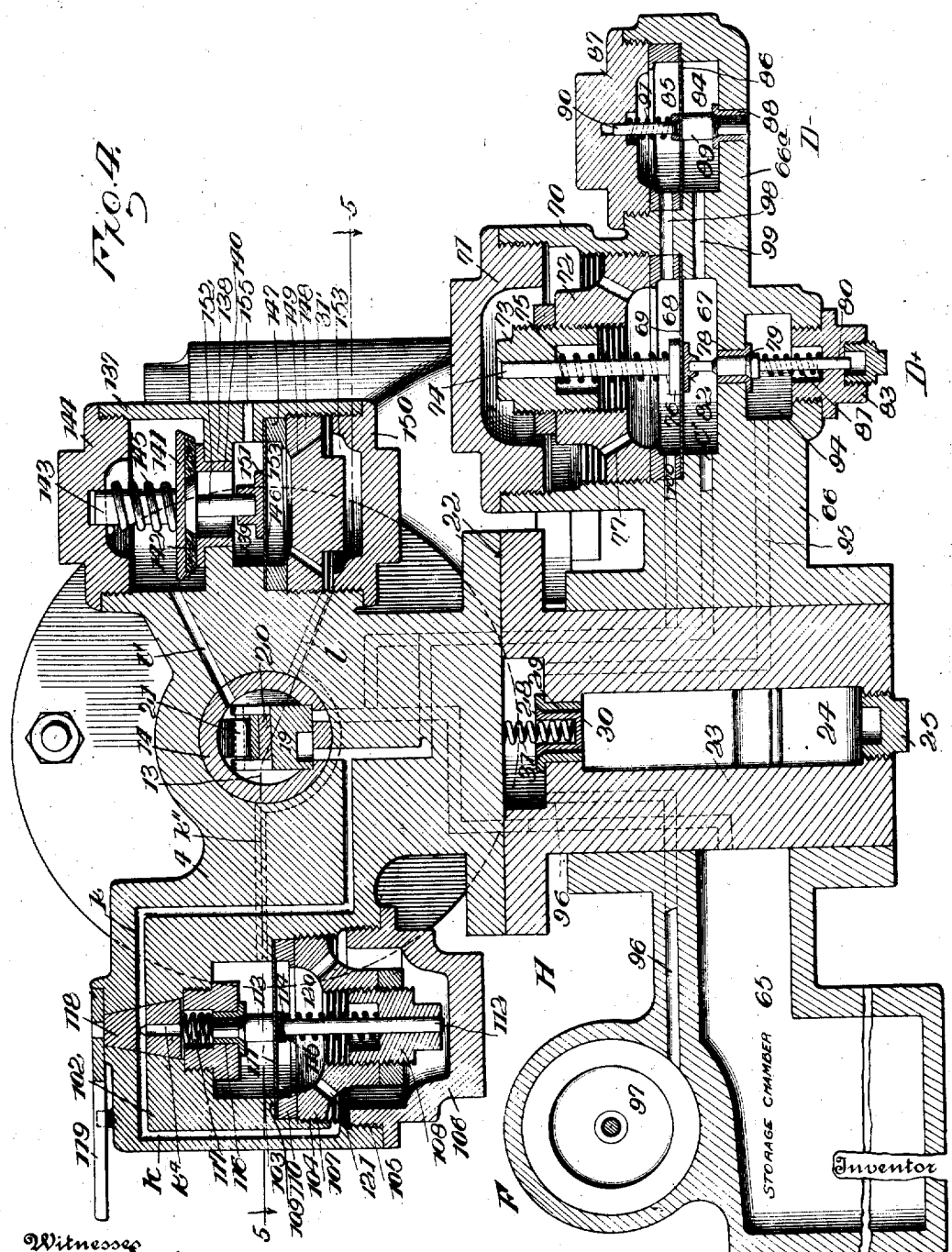

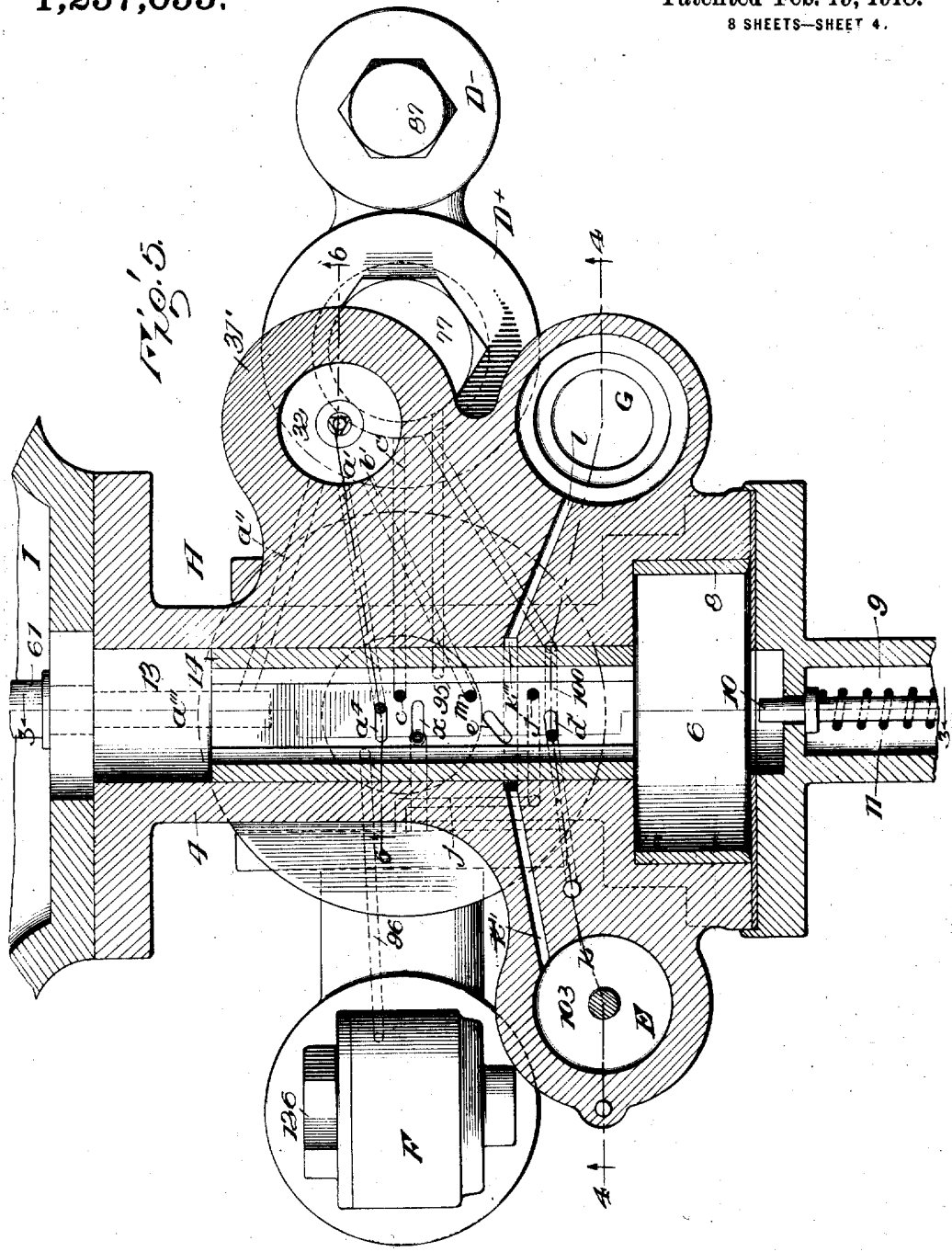

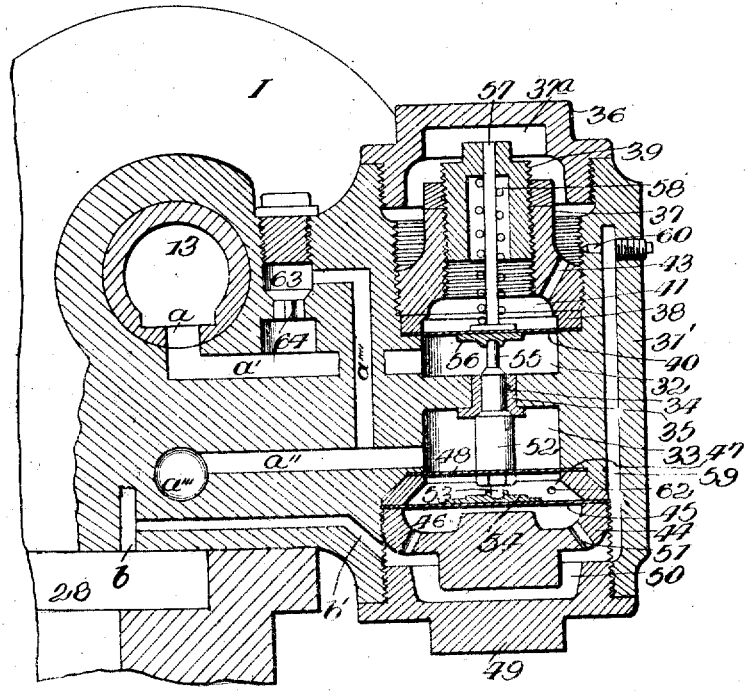
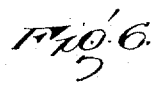
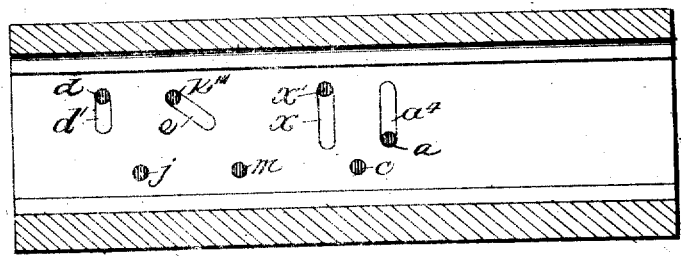
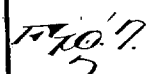
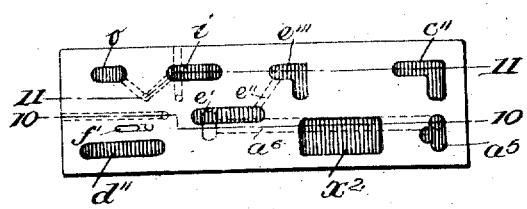

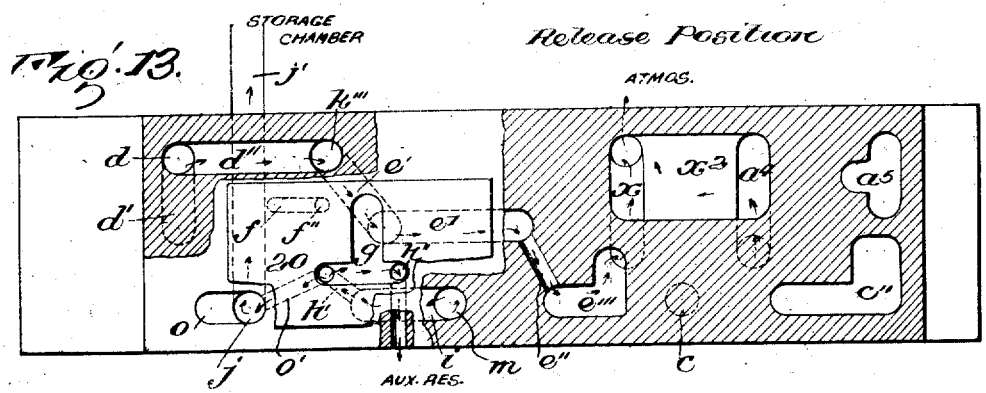

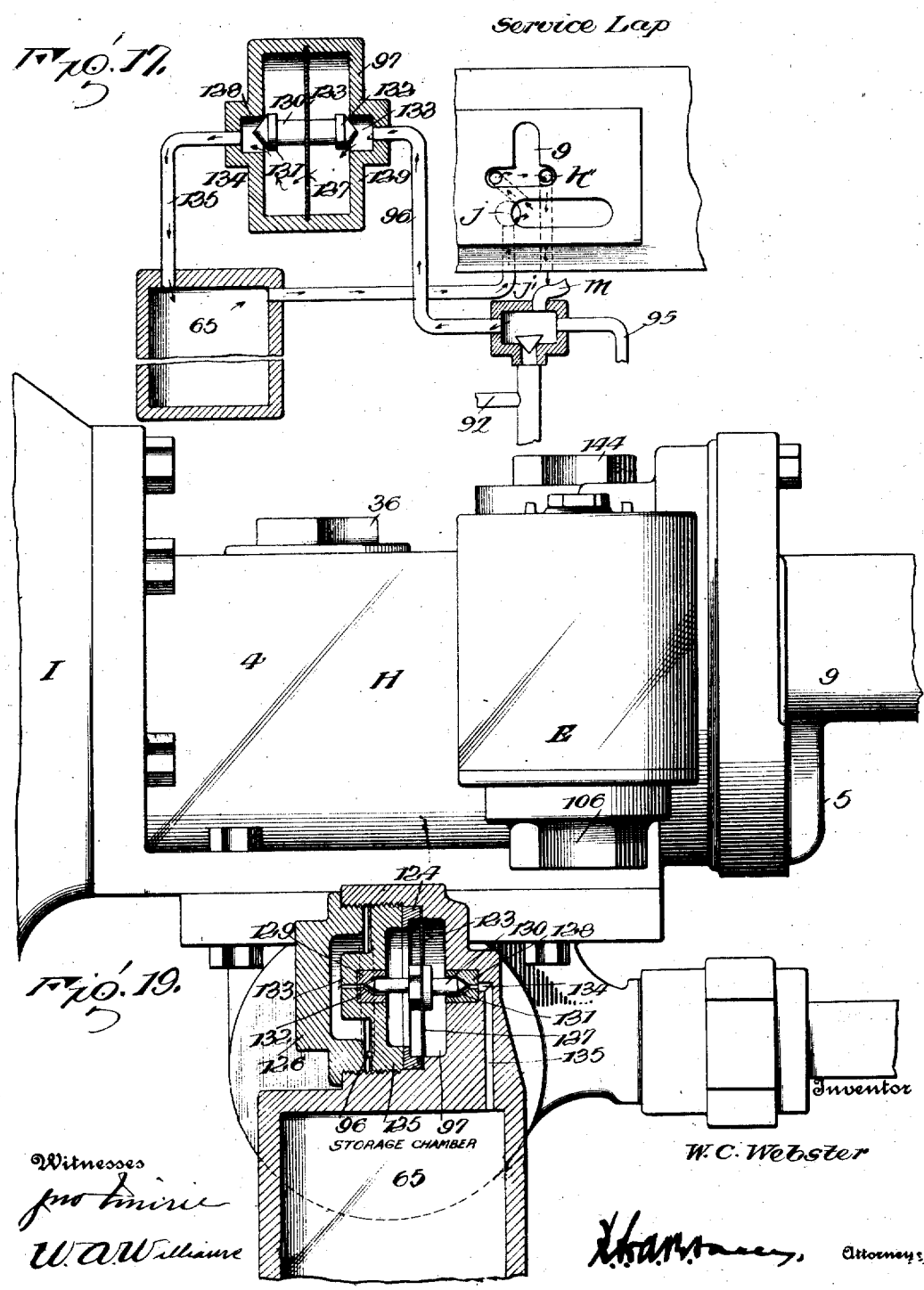

UNITED STATES PATENT OFFICE.

WILLIS C. WEBSTER, OF DUBOIS, PENNSYLVANIA, ASSIGNOR TO BUFFALO AIR-BRAKE COMPANY, OF PHOENIX, ARIZONA, A CORPORATION OF ARIZONA.

TRIPLE VALVE FOR AIR-BRAKES.

1,257,055.

Specification of Letters Patent. Patented Feb. 19, 1918.

Application filed May 29, 1914. Serial No. 841,916.

*To all whom it may concern:*

Be it known that I, WILLIS C. WEBSTER, a citizen of the United States, residing at Dubois, in the county of Clearfield and State of Pennsylvania, have invented certain new and useful Improvements in Triple Valves for Air-Brakes, of which the following is a specification.

My invention relates to air brake systems and particularly to the triple valves thereof. Broadly speaking, the objects of my invention are as follows:

To provide a triple valve which, while peculiarly adapted to be used in connection with the complete air brake system devised by me and described in my pending application, Serial No. 841,655, filed on the 28th day of May, 1914, is also adapted to be used in any ordinary air brake system.

A further object of the invention is to provide a triple valve so constructed that when the brakes of a train are released the brakes at the rear end of the train are released before the brakes at the head end of the train are released, thus eliminating danger of breaking the train in two.

Still another object of the invention is to so construct the triple valve that means are provided whereby the brake cylinders of all the cars of a train are supplied with air at the same pressure regardless of the length of the brake cylinder piston travel.

A further object of the invention is to so construct the triple valve as to provide means whereby the brake cylinder pressure may be increased corresponding with the rise of train line pressure and in this connection to provide means whereby the mechanism for securing this increased pressure in the brake cylinders is not applied to empty cars.

A further object of the invention is to provide means whereby if the slide valve piston does not return to release position upon a predetermined increase in train line pressure, the auxiliary reservoir pressure may be exhausted so that the train pipe pressure will positively insure this movement.

A further object of this invention is to eliminate the emergency feature from triple valves and provide a triple valve with a quick service instead of the emergency application.

Still another object of my invention is to provide means whereby a storage chamber may be fed from the brake pipe with the triple piston and slide valve in lap position and to provide means whereby the pressure in the storage chamber and the auxiliary reservoir may be built up to that of the brake pipe after the slide valve has come to lap position.

A further object of the invention is to maintain equalization between the pressure in the train line and in the storage chamber and auxiliary reservoir at any train pipe reduction that may be made.

These several objects will be hereafter further referred to and more fully explained. My invention is illustrated in the accompanying drawings, wherein—

Figure 1 is a diagrammatic view of my improved triple valve showing the parts thereof in the position taken when the valve is at "release."

Fig. 2 is a like view to Fig. 1 but showing the mechanism of the triple valve at "service" position.

Fig. 3 is a vertical longitudinal section of a triple valve constructed in accordance with my invention, this view also showing in section a portion of the auxiliary reservoir and a portion of the train line or brake pipe.

Fig. 4 is a vertical section on the line 4—4 of Fig. 5.

Fig. 5 is a horizontal section on the line 5—5 of Fig. 4.

Fig. 6 is a fragmentary vertical section on the line 6—6 of Fig. 5.

Fig. 7 is a plan view of the slide valve seat, the walls of the seat being in section.

Fig. 8 is an under side plan view of the slide valve to show the ports therein.

Fig. 9 is an under side view of the graduating valve detached.

Figs. 10 and 11 are longitudinal sections of the slide valve, these sections being taken respectively on the lines 10—10 and 11—11 of Fig. 8.

Fig. 12 is a perspective detail view of the slide valve looking toward its under side.

Fig. 13 is a top plan view partially in section of the slide valve and the graduating valve to show the positions of the parts in "release position."

Fig. 14 is a like view to Fig. 13 but showing the position of the parts at the first movement of the slide valve toward "service position."

Fig. 15 is a like view to Fig. 14, but showing the position of the slide valve and graduating valve at "service position."

Fig. 16 is a like view to Fig. 15 but shows only a portion of the slide valve, this view showing the position of the graduating valve when the parts are at "service lap" position.

Fig. 17 is a diagrammatic view of the equalizing valve, a portion of the slide valve and the graduating valve, the latter being shown at "service lap" position.

Fig. 18 is a like view to Figs. 13, 14 and 15, showing the position of the slide valve and graduating valve at quick service position.

Fig. 19 is an elevation of the triple valve, the equalizing valve being shown in section.

Referring for the moment to Figs. 1 and 2, it may be said that A represents the train line or brake pipe, the pressure in which is controlled by the usual engineer's valve (not shown). The brake cylinder is designated B. The automatic retaining device is designated C. The brake cylinder pressure equalizing mechanism is designated D+ and D—. The mechanism for securing brake cylinder pressure in excess of the normal or standard amount is designated E; the equalizing valve is designated F; the auxiliary venting mechanism is designated G; the piston valve and allied parts are designated H; and I designates the auxiliary reservoir.

Referring now to Figs. 3, 4, 5 and 7 to 11, it will be seen that the triple valve has the usual body 4. This body at one end abuts against and is connected to the auxiliary reservoir I in the usual manner and at its opposite end the body is closed by the cylinder cap 5. All these parts are of the usual construction and require therefore no special description.

Disposed within the chamber 6 of the body is the piston 7, this chamber 6 having the usual bushing 8 grooved, as at 8ª, to admit compressed air to the auxiliary chamber. The cap 5 includes a chamber 9 and within this chamber is disposed the usual graduating stem 10 and spring 11. The outer end of the stem is supported in the usual cap nut 12, whereby the graduating stem may be removed. The inner end of the stem is supported in a spider.

Beyond the chamber 6, the valve body is formed with a valve chamber 13 which is cylindrical in form and the wall of which is provided with a bushing 14, the bottom of this bushing being flat and forming a seat for the usual slide valve. The chamber 13 opens at its end opposite the chamber 6 into the auxiliary reservoir. At its other end the valve stem 17 has the usual beveled shoulder 15, this having the usual groove 16. This piston stem 17 carries at its end opposite the shoulder 15 a spider 18 and disposed between the spider 18 and the shoulder 15 is the slide valve 19 which, as usual, is shorter than the stem 17. Operating in the upper face of the slide valve and carried in a recess in the stem 17 is the graduating valve 20 illustrated in Fig. 9. The slide valve is held to its seat by a spring 21.

By reference to Fig. 3 it will be seen that the under side of the valve body 4 is formed with a circular face 22 which confronts a like face upon the body 23 of a trap or dirt collector 24. This is provided in its bottom with a removable plug 26 whereby the dirt collected in the trap or any water collected therein may be drained away and the interior of the trap cleaned. The body of the dirt collector or trap has the usual nipple projecting from one end whereby the trap may be connected to the train pipe or brake pipe A.

Disposed opposite to this nipple is an approximately horizontal flange 27 or baffle which impedes the passage of dirt from the train pipe into the triple valve. The upper face of the wall of the body 23 is recessed, as at 28, and the wall between this recess and the chamber 24 is perforated for a bushing 29 in which seats a check valve 30 held to its seat by a spring 31. The function of this chamber 28 and check valve will be later stated.

The first device to be considered in connection with the triple valve is the means for admitting pressure from the auxiliary reservoir to the brake cylinder, whereby to set the brakes and the means for simultaneously disconnecting the brake cylinder from the open air, this mechanism being designated C. This mechanism is also used for releasing the brakes of the rear cars of a train before the brakes of the forward cars of the train are released, is denominated the automatic retainer and is illustrated in Fig. 6.

It will be seen from Figs. 4 and 5 that I form in the valve body 4 to one side of the valve body, the valve casing 31'. This valve casing is provided with two chambers 32 and 33, the separating wall between these chambers being formed with a port 34 lined by a bushing 35, the lower end of which forms a valve seat. The upper portion of the chamber 32 is enlarged and the annular wall surrounding this enlarged portion is threaded. Having screw threaded engagement with the upper end of the wall is a cap 36 and having screw threaded engagement with the lower portion of the wall is an internal cap 37 which is interiorly screw threaded and normally rests upon a ring 38. A screw threaded plug 39 closes the upper end of the cap 37. Disposed between the ring 38 and body 31 is a diaphragm 40 so that a chamber 41 is formed above the diaphragm, and a chamber 32 below the diaphragm. The chamber 41 communicates with the space around the cap 37 by means of the ports 43.

Disposed in the lower end of the valve chamber below the chamber 33 and having screw threaded engagement with the annular wall of the valve chamber is an annular casing, designated 44, this casing being formed of an upper and a lower section, supporting between them the diaphragm 45 which separates the space inclosed within the said chamber 44 into two parts 46 and 47. A diaphragm 48 is disposed between the inner end of the wall 44 and the valve body so that it separates the chamber 33 from the chamber 47. The extreme lower end of the valve body is closed by a cap 49. The chamber 46 is connected to the space 50 between the cap 49 and the member 44 by means of the ports 51.

Seating against the valve seat 35 is a valve 52, this valve being attached to the diaphragm 48 and having a stud 53 projecting below the diaphragm 48 and seating in a notch or recess formed in the upper face of a disk 54 resting against the diaphragm 45. The stem of the valve 52 is extended upward, as at 55, and engages with the disk 56 bearing against the diaphragm 40. Extending upward from the diaphragm 40 is a stem 57 which passes up through the plug 39, and surrounding this stem and urging the diaphragm downward is a spring 58.

The space 50 below the diaphragm 45 is connected by means of a duct 59 with the space above the member 37 and hence with the space above the diaphragm 40. This duct 59 extends upward through the wall of the valve casing and is connected to the space above the diaphragm 40 by means of a very much reduced or choked port 60.

The face or seat for the slide valve in the chamber 13 is formed with a transverse recess or cavity $a^4$ having a port $a$ which is connected by means of the passage $a'$ with the chamber 32 below the diaphragm 40. The chamber 33 is connected by means of a port $a''$ with a passage $a'''$ leading to the brake cylinder by means of the pipe 61 which passes through the auxiliary reservoir. The space 50 beneath the member 44 is connected to the chamber 28 by means of a passage $b'$ opening by means of a port $b$ into said chamber. The space just above the diaphragm 45 opens by means of a port 62 to the open air.

Preferably the passage $a'$ is connected through a check valve chamber 63 to a passage $a''''$, which opens into a passage $a''$. Disposed in the chamber 63 is a check valve 64, which closes against back pressure from the brake cylinder but opens to a rise of pressure in the passage $a'$, to permit air from the auxiliary reservoir to by-pass the retaining valve and flow direct to the brake cylinder.

It will now be necessary to consider the ports in the slide valve which co-act with the ports $a$ and with the retaining valve structure.

As seen in Fig. 7, $a^4$ is transversely extended from port $a$. The slide valve 19 is provided with a cavity $a^5$ approximately T-shaped, into one arm of which extends a longitudinal passage $a^6$, which at its forward end opens through the upper face of the slide valve. The passage $a^6$ is brought into communication with the air in the chamber 13 upon the initial movement of the slide valve. Also formed in the face of the slide valve seat is a transversely extending cavity $x$ which leads by the port $x'$ to the atmosphere.

The under side of the valve is provided with the cavity $x^2$ which is adapted to bridge the exhaust cavity $x$, and the cavity $a^4$. Under normal conditions, that is when the slide valve is in its "release" position, the cavity $x^2$ connects the cavity $a^4$ with the cavity $x$. Hence the brake cylinder is connected to the open air. Now upon a movement of the slide valve, to service position, the cavity $x^2$ will take the position shown in dotted lines in Fig. 15, cutting off the connection of $a^4$ with $x$, and the cavity $a^5$ will be over the cavity $a^4$, thus connecting the port $a^4$ with the auxiliary reservoir through the passage $a^6$.

The operation of this portion of my invention is as follows:

Under normal circumstances, that is, when the brakes are disposed in "release" position, the valve 52 is held open by the force of the spring 58 and air pressure. This would not be the case were no spring used, though the pressure in chambers $37^a$ and 46 would be the same, as the greater area of the diaphragm 45 compared with the diaphragm 40 would hold the valve closed. This greater power acting to force the valve upward is counter-balanced, however, by the spring 58 which therefore holds the valve 52 open so long as the pressure in the chamber 41 is equal to the pressure in the chamber 46.

Now upon a reduction of pressure in the train pipe and a movement of the slide valve to apply the brakes, the port $a$ will be opened and air will flow from the auxiliary reservoir to the brake cylinder by way of the passage $a'$, the chambers 32 and 33 and the passages $a''$ and $a'''$ or by way of the chamber 63 and the passage $a''''$. As the brake pipe pressure is reduced, the pressure in the chamber 46 is also reduced to the same extent, being vented through the passage 130

$b'$, valve D+ and the triple valve D to the brake cylinder, but as air in the chamber 37ᵃ (and therefore the air in the chamber 41) is impeded in its outward flow by the restricted port 60 it follows that the pressure in the chambers 46 and 50 will be less than in the chamber 37ᵃ.

When now the release of the brakes is secured by operating the engineer's valve and raising the pressure in the brake pipe the slide valve will shift again to release position. This will connect the port $a$ with the exhaust port. While the pressure in the chamber 46 will increase with the increase of train pipe pressure the pressure in the chamber 41 will not increase in the same proportion because of the restricted port 60. Hence, there will be greater pressure below the diaphragm 45 than above the diaphragm 40 and the valve 52 will close, trapping the air in the brake cylinder. Of course the pressure in the brake cylinder will also close the valve 64. The valve 52 will be held closed until such time as the pressures in the chamber 41 and the chamber 46 are equalized, whereupon the spring 58 opens the valve 52 and the brake cylinder pressure is exhausted to the atmosphere allowing the brakes to release.

The reason for using the check valve 64 and by-pass $a''''$ is that not only does the by-pass allow air to flow from the auxiliary reservoir upon a reduction without the necessity of the air passing through the retainer C, but it permits a re-application of the brakes before the air in the upper and lower chambers 41 and 47 has had a chance to equalize.

If this by-pass were not provided, then upon a re-application of the brakes, very shortly after a previous application,—so shortly that the pressures had not equalized in the chambers 41 and 47,—the valve 52 would be held closed, and would prevent the inlet of air from the auxiliary reservoir to the brake cylinder upon this second reduction.

One very great advantage due to the action of the automatic retainer is that by it I get a release of the brakes at the rear of the train before the brakes at the head of the train are released. This is due to the fact that the holding of air in the brake cylinder by the difference in pressure between the chamber 46 and the chamber 41 can only occur when there is a relatively sudden rise in pressure in the brake pipe. When the rise of pressure is gradual in the brake pipe and in the chamber 46, the rise of pressure in the chamber 41 will be nearly as rapid as in the chamber 46.

It is of course understood that when there are many cars to a train and consequently a long brake pipe or train pipe, the air pressure will rise in the forward or head end of the train pipe before it does in the rear end thereof and the rise of pressure in the brake pipe will be therefore gradual at the rear end. It follows therefore that 1 will only get this trapping or holding of the air in the brake cylinders, by the action of the diaphragms 48 of the several triple valves as far back in the train as the rise of air pressure is rapid enough to secure an upward movement of the diaphragm 45 which will overcome the power of the spring 58.

The next construction to be described is the valve mechanisms which I use for building up pressure in the brake cylinder in case of deficient pressure therein, that is pressure below a predetermined amount, and the mechanism for reducing pressure in the brake cylinder or exhausting pressure therefrom in case of excess pressure therein above a predetermined amount.

The object of the mechanism which will now be described is to provide means whereby the pressure in the brake cylinders may be controlled either by building up or increasing the pressure in brake cylinders whose piston travel is longer than 8 inches and exhausting air from or reducing excess pressure in brake cylinders having a piston travel shorter than 8 inches.

The sides of the body or section 4 engage respectively one end of a storage chamber 65 and one end of a valve casing or body 66 disposed opposite the chamber 65. This is clearly illustrated in Fig. 4. The body 66 has formed in it a chamber D+ divided into two sections 67 and 68 by a diaphragm 69. The annular wall 70 of this chamber extends upward and the upper portion of this chamber is larger in diameter than the lower portion thereof. A cap nut 71 engages the upper end of the wall. Having screw threaded engagement with the lower portion of the wall and closing the upper chamber 68 is the annular cap 72 having an upwardly extending interiorly screw threaded neck in which is disposed the plug 73. Engaging the diaphragm 69 is a stem 74 which at its upper end passes through a guide perforation in the plug 73. A spring 75 surrounds the stem and bears at one end against the plug 73 and at its other end bears against a head 76 formed on the stem and engaging the diaphragm. Relief ports 77 open through the cap 72 so as to connect the space 68 above the diaphragm with the space within the cap 71.

The floor of the chamber 67 is ported at 78 which port is controlled by a valve 79 carried by a stem 80, the valve being urged upwardly to its seat by a spring 81. The valve 79 projects upward through the port 78 and engages loosely in a notched disk 82 carried on the under side of the diaphragm 69. Thus a descent of the diaphragm will open the valve 79 and a rise of the diaphragm beyond its normal position, will close the valve 79. The valve stem 80 is guided in a cap or plug 83.

The valve body 66 is laterally extended, as at 66ª, as shown in Fig. 4, and formed in this extension is a regulating chamber divided into two separate chambers 84 and 85 by a diaphragm 86, this diaphragm being held in place by a clamp ring, as is the diaphragm 69 previously described. The chamber 85 is closed at its upper end by means of a cap nut 87 which has screw threaded engagement with the annular wall of the chamber 85. The floor of the chamber 84 is perforated and provided with a bushing 88, this bushing forming a valve seat, and coacting with this valve seat and normally closed against the seat is a valve 89 which is carried by the diaphragm 86 and is movable therewith in both directions. This diaphragm 86 carries an upwardly extending stem 90 which enters a guide opening formed in the cap 87 and which is surrounded by a spring 91 urging the diaphragm to its normal position and the valve 89 to its seat. It will be obvious now that when the pressure within the chamber 84 is greater than the pressure in the chamber 85 the diaphragm 86 will be forced upward, raising the valve 89 from its seat and allowing the pressure in the chamber 84 to be vented to the atmosphere. When the pressure in the chamber 84 decreases, however, beyond a predetermined point, it is obvious that the valve 89 will close and stop this venting action.

Referring to Fig. 3, it will be seen that the upper portion of the trap or dirt collector 24 is connected by means of a passage 92 to the chamber 9, and it will also be seen that the forward wall of the trap or collector 24 immediately below the intersection of the passage 92 with the chamber 24 is downwardly extended, as at 93, toward the baffle flange 27, thus forming a relatively contracted opening from the lower portion of the chamber 24 into the upper portion thereof. Thus there is always a communication between the train pipe A and the chamber 9 and the chamber 6 through the dirt collector 24 and the passage 92.

The valve seat 78 opening from the chamber 67 opens into a chamber 94 from which a duct 95 leads into the chamber 28. From this chamber 28, a duct 96 leads to an equalizing chamber 97, the construction and purpose of which will be later described.

The chamber 85 is connected with chamber 68 by a duct 98, and the chamber 84 is connected to the chamber 67 by a duct 99. Thus pressure in the chamber 68 is the same as that in the chamber 85, and pressure in the chamber 67 is the same as in the chamber 84. From the chamber 67, leads a passage $c'$ which terminates in a port $c$ in the slide valve seat. This port $c$ coacts with an angular cavity $c''$ in the under face of the slide valve, which, when the slide valve is in service position, as shown in diagram in Fig. 2 and in Fig. 15, connects the port $c$ with the cavity $a^4$, and thus with the brake cylinder by way of the passages $a'$ and $a''$. When the slide valve is in the release position, however, the port $c$ is blanked. Thus, when the slide valve is in service position, the lower chambers 67 and 84 are both in communication with the brake cylinder. The upper chambers 68 and 85 are connected by means of a duct or passage 100 with a port $d$ which opens into a transverse cavity $d'$ formed in the upper face of valve seat, which coacts with a cavity $d''$ extending longitudinally in the under face of the slide valve. This cavity $d''$, when the valve is in release position, as in Fig. 13, connects the port $d$ with a cavity $e$, in the face of valve seat. This cavity $e$ extends diagonally, and in the path of movement of a cavity $e'$, which it overlaps in release position as shown in Fig. 13. The cavity $e'$ in turn is connected by a duct $e''$ to an angular cavity $e'''$, in the lower face of the valve. The end of this cavity opposite the duct $e''$ is disposed to overlap one end of the exhaust cavity $x$, which as before explained, is connected to the atmosphere. Also formed in the body of the slide valve is a small longitudinal passage $f$, opening at one end through the under face of the valve at $f'$, and at its other end through the upper face of the valve at $f''$. In release position of the valve, both ends of the passage $f$ are blanked, but at service position, the end $f'$ overlaps the cavity $d'$ while its other end is overlapped by a T-shaped cavity $g$, formed in the under face of a graduating valve 20, carried in a recess in the under face of the stem 17.

In service position this port $g$ in the graduating valve connects the port $f'$ with a port $h$, forming one end of a passage $h'$, and opening through the upper face of the slide valve 19. The other end of the passage $h'$ opens into a cavity $i$, which in service position of the valve 19, slightly overlaps a port $j$, of a passage $j'$ which leads to the storage chamber 65. In service lap position communication between the chambers 68 and 85 and the chamber 65 is cut off as the graduating valve stops communication between the ports $f'$ and $h$.

Thus it will be seen that at release position, the upper chambers 68 and 85 are connected to the atmosphere, while in service position, they are connected to the storage chamber until valve 20 moves to lap position and in service lap position they are sealed.

The capacity of the storage chamber has the same relation to the capacity of the chambers 67 and 84 as the capacity of the auxiliary reservoir has to a brake cylinder having a 10-inch stroke. The lower chambers 67 and 84 in service position are connected to the brake cylinder B. Hence on the upper side of diaphragms 69 and 86 we have a pressure equal to that of a brake cylinder with a ten inch piston travel (the springs 75 and 91 and air pressure exerting a pressure against the diaphragm equal to a pressure exerted by a cylinder having an eight inch piston travel), while on the other side of the diaphragm we have a pressure equal to that of the brake cylinder, whatever that may be.

The object of the brake cylinder equalizing devices D+ and D— heretofore described is to build up pressure in those brake cylinders having a piston stroke of over 8 inches and reduce pressure in those brake cylinders having a piston stroke of less than 8 inches. The operation of the equalizing devices D+ and D— is as follows:

On a movement of the slide valve to service position by a reduction of train pipe pressure, communication is opened as before explained and as most clearly seen in Figs. 2 and 4 from the chambers 67 and 84 to the brake cylinder, and from the chambers 68 and 85 to the storage chamber 65. As the storage chamber has a pressure of 70 pounds, it follows that after a 7 pound reduction in the train line is made the connected chambers 68 and 85 will have a standard pressure therein of 10½ pounds (which includes the pressure of the springs 75 and 81) or exactly the same as the brake cylinder if the piston travel thereof is of the standard length of 8 inches.

If now the brake cylinder pressure is too low—that is below the standard for a cylinder having a piston travel of 8 inches—the pressure on the under side of the diaphragm will be less than on the upper side, and the pressure on the upper side will cause the diaphragm to move downward, opening the valve 79 and letting train pipe air into the chamber 67, and from thence into the brake cylinder as seen in Fig. 2. When the pressure in the two chambers 67 and 68 has become equalized, the spring 81 forces the valve upward, closing the opening 79.

If now the travel of the piston is shorter than 8 inches the reverse action will occur. In this case the pressure on the under side of the diaphragm 69 will be greater than on the upper side and the valve 79 will be held closed. In this case, however, the pressure on the under side of the diaphragm 86 will be greater than on the upper side, the valve 89 will be lifted and the excess pressure will escape until the pressures above and below the diaphragm are equalized, when the valve will close.

Another object of my invention is to provide means to automatically create a high brake cylinder pressure from a small brake pipe reduction and maintain the high pressure in the brake cylinder during the time that the brakes are applied without increasing the volume of the equipment. This mechanism is particularly applicable for use in mountain service and on high speed trains or trains which are heavily loaded and is automatically controlled by the engineer.

The mechanism whereby this result is obtained, is designated E in Figs. 1 and 2 and is illustrated in detail in Fig. 4. By reference to Fig. 4 it will be seen that I provide a valve casing designated 102 which is disposed to one side of the main valve body 4. The valve casing is hollow to provide a chamber 103 and the peripheral wall of the valve casing below this chamber is screw threaded as at 104 and 105. Engaging the screw threads 105 and closing the open lower end of the casing is a cap 106 and disposed within the wall of the valve casing and engaging the screw threads 104 is an interior cap or spider 107. This is annular in form and the central open portion thereof is closed by means of a screw threaded plug 108.

Disposed between a shoulder 109 formed upon the valve casing 102 and the upper end of the spider or cap 107 is a ring 110, and clamped between this ring and the shoulder 109 is a diaphragm 111. Attached to this diaphragm in any suitable manner and extending down therefrom is a valve stem 112 which has sliding engagement in the plug 108. The stem 112 is formed with a head 113 which forms the valve proper, the diaphragm 111 being clamped against this head by the nut 114. A coil spring 115 surrounds the stem 112 and bears at its lower end against the plug 108 and at its upper end against the under side of the diaphragm 111 thus forcing the valve upward.

Disposed in the upper end of the valve body 102 and forming part of the upper wall of the chamber 103 is an annular plug carrying a bushing 116 which forms the valve seat for the valve 113. A spring 117 is disposed within the annular plug above the bushing 116 and bears upward against a stop cock 118. This stop cock at its upper end projects through the upper end of the valve body 102 and has attached to it a handle 119 whereby it may be operated.

The space 120 below the diaphragm 111 is connected by means of ports 121 leading through the annular member 107 into the space inclosed by the cap 106. The valve casing 102 is formed with a passageway $k$ which extends to and opens through the face of the slide valve seat in the chamber 13 at the port $d$ as shown clearly in Fig. 1. Opening into the space above the diaphragm is a port $k'$ which leads by a passage $k''$ to a port $k'''$ opening into the cavity $e$ in the slide valve seat.

In the release position of the parts as shown in Fig. 1, both of the passages $k$ and $k''$ are connected by the cavity $d''$ to the open air by way of the cavities $e$, $e'$, duct $e''$, cavity $e'''$ and cavity $x$. When the parts are in the service position, the passage $k$ is connected by the cavity $d'$ to the duct $f$ and to the cavity $g$ in the under side of the graduating valve 20 which as before described is connected by means of the duct $h'$ to the cavity $i$. This cavity $g$ of the graduating valve in the service position of the parts is disposed to connect the port $f''$ with the port $h$ and thus connect the port $j$ with the cavity $d'$. This port $j$ as before stated is the opening of the passage leading into the storage chamber 65. Thus in the service position of the parts, the portion 103 of the chamber 102 above the diaphragm 111 is connected to the train pipe through the passage $k''$, the port $k'''$, the passage $e$, the cavity $e'$, the passage $e''$, the cavity $e'''$, the port $m$ and the check valve chamber 29 to the train line, while the portion 120 of the chamber below the diaphragm 120 is connected to the storage chamber through the passage $k$, the port $d$, the cavity $d'$, the passage $f'$ in the valve, the small cavity $g$ in the graduating valve, through the passage $h$ in the slide valve into the cavity $i$ and thence by the port $j$ and the passage $j'$ into the storage chamber. It will also be seen that in this position of the parts, the lower portion 120 of the chamber 103 below the diaphragm is also connected to the upper compartment or chamber 68 of the equalizing valve chamber D+. Considering 70 pounds as the normal train line pressure, a 5 pound reduction in train line pressure will result in a pressure in the brake cylinder of approximately 12½ pounds and a fluid pressure of 12½ pounds will therefore be admitted to the chamber beneath the diaphragm 111. I therefore under ordinary conditions adjust the tension of the spring 115 in such a manner that it will exert a pressure against the diaphragm of substantially 52 to 53 pounds in order that when the chamber above the diaphragm is subjected to the reduced train line pressure of 65 pounds the under face of the diaphragm will be subjected to substantially the same pressure due to the added pressures of the spring and the back pressure from the brake cylinder, under which circumstances the valve 113 will remain closed. If now the brakes are released and pressure in the train pipe be increased to 90 pounds, then upon a train pipe reduction to again apply the brakes this increased pressure upon the diaphragm 111 will cause this diaphragm to be forced downward. This will act to open the valve 113 and air under pressure will pass through the duct $k^4$ into the passage $k$. This air will pass into the upper chamber or compartment 68 of the equalizing valve D+. This increase of pressure, during service application in the compartment 68 will cause the valve 79 to open and thus direct connection will be opened between the train pipe and the brake cylinder.

When the pressure is equalized in both chambers of the valve structure D+, the valve will shut. Thus if the train pipe has in it a pressure of 90 pounds and a 5 pound reduction is made, a portion of the pressure in the train pipe will be transferred, upon a movement of the slide valve to service position, to the brake cylinder. When the graduating valve moves back to service lap position it will cut off connection between the storage chamber and the chambers E and D+. It will also be seen that by rotating the handle 119 to a slight extent in one direction, the valve plug 118 or cut-out cock will be turned so as to cut off communication between the mechanism E and the slide valve. I have provided this cut-out cock so that in mixed trains of empty and loaded cars, I may do away with excess braking power on the empty cars, as the empty cars may be cut out if so desired so as to create a high brake cylinder pressure on the loaded cars alone and the standard degree of braking power will then be applied on the empty cars of the train. This mechanism E, however, permits a mixed train of both empty and loaded cars being operated with standard brake pipe pressure of 70 pounds without disturbing the cut-out cocks on any cars, the mechanism then being inoperative.

One of the many advantages of my mechanism lies in the fact that the excess brake pressure controlling mechanism E eliminates the necessity of setting hand brakes at the top of a grade. On long and heavy grades, train men are obliged to constantly walk up and down the length of the train and take up slack in the brakes due to wear of the brake shoes. This is not only inconvenient but very dangerous as well, as there is always liability of the nut coming off the brake wheel and the sudden relaxing of strain throwing the brakeman off the car. With hand brakes, the pressure of the brake shoes never remains constant, while with my automatic excess pressure controlling mechanism E, the air under pressure following in each brake cylinder as the shoe wears and the piston travel gets longer, the pressure remains constant no matter how long the brakes are applied.

I will now describe the equalizing mechanism or valve designated F in Figs. 1 and 2. This mechanism has for its object to provide for feeding the storage chamber 65 from the brake pipe with the triple piston and slide valve in lap position and to provide means whereby the pressure within the storage chamber and within the auxiliary reservoir may be built up to that of the brake pipe after the valve has shifted to lap position. In order that a triple valve can assume lap position, it is necessary that the auxiliary reservoir pressure shall drop slightly below the brake pipe pressure, and in order to hold the triple valve in service lap position and feed the brake pipe without releasing the brakes, it is necessary to build up the pressure in the storage chamber and auxiliary reservoir. The mechanism designated F then is for the purpose of building up and maintaining the pressure in the storage chamber and auxiliary reservoir equal to that in the brake pipe and to maintain the pressure in these chambers during the service application or while the triple valve is in lap position.

Referring to Figs. 1, 2, 4 and 17, it will be seen that I provide a chamber 97 within which is disposed a diaphragm 123, this diaphragm being held in place by a ring 124. An inner screw threaded cap 125 engages the wall of the chamber 97, and closing the adjacent end of the chamber is a cap 126. The diaphragm 123 divides the chamber into two parts and this diaphragm is formed with a very small perforation 127. The opposite end walls of the valve are provided with the oppositely disposed valve seats 128 and 129 with which a double valve 130 coacts. This double valve is provided at opposite ends with the oppositely directed conical heads 131 and 132 coacting with the valve seats 128 and 129, respectively. One end of the valve casing 122 is provided with the enlargement 133 and the other end is provided with the enlargement 134. From the enlargement 134 extends a duct or passage 135 which connects to the storage chamber 65. Opening into the space between the outer cap 126 and the inner cap 125 and therefore opening into the enlargement 133 is a duct 96 which extends into the chamber 28 as shown clearly in Fig. 4.

It will be seen now that in release position of the triple valve the storage chamber 65 is connected by the passage $j$ with the brake pipe through the chamber 28 and that the equalizing valve F is connected on one side of the diaphragm with the storage chamber and on the other side by the duct 96 with the chamber 28. When the triple valve has moved to the service lap position as shown in Fig. 17, the auxiliary reservoir will be connected to one side of the diaphragm through the storage chamber, the other side of the diaphragm 123 receiving pressure from the chamber 28 which is connected with the train pipe. The valve is normally in its middle position so that normally air can pass freely through the passage 96 into the chamber 122. With a relative increase of pressure in the train pipe the valve will shift toward the left in Fig. 17. In other words, the valve head 131 will close against the seat 128. The pressure on one side of the diaphragm will therefore be higher than on the other side until the air under pressure on the side connected to pipe 96 leaks into the space on the other side of the diaphragm. When the pressure on both sides of the diaphragm has been equalized, the valve will return to its normal position, that is, will open away from the seat 128 and air will flow to the storage chamber 65 and thence to the reservoir, provided the valve is in lap position. A reduction in train pipe pressure will cause the closing of the valve in the opposite direction. When pressure on the storage side has dropped, the valve will close, and when the pressure on both sides has again equalized, it will again open. The valve thus fluctuates until the pressure in the auxiliary reservoir is equal to that in the train line.

Another of the objects of my invention is to provide means whereby the auxiliary reservoir pressure may be vented to the atmosphere if the triple piston and slide valve stick or for any reason fail to resume release position with the increase of brake pipe pressure. The mechanism designated G which I denominate the auxiliary venting device is so designed as to vent auxiliary reservoir pressure to the atmosphere, provided the triple valve does not move to release as it should, is shown.

The mechanism whereby this is accomplished is shown in detail in Fig. 4 and diagrammatically in Figs. 1 and 2. It consists of a valve chamber designated 137 divided into two portions by a transversely extending septum 138 which has a centrally disposed opening 139 and a bushing 140 constituting a valve seat for a valve 141. The under side of this valve has a washer 142 of leather or other soft substance, the face of which is adapted to bear against the valve seat formed by the upper flange on the bushing 140. The valve stem 143 extends upward into a recess formed in a cap 144 that closes the upper end of the valve casing 137, and surrounding the valve stem and bearing at its lower end against the valve and at its upper end against the cap 144 is a spring 145 which forces the valve downward upon its seat.

Disposed below the septum 138 is a diaphragm 146 which is held in place by a ring 147, in turn held in place by a cap 148 having screw threaded engagement with the wall of the valve casing. This cap is ported at 149. Closing the lower end of the casing is an exterior cap 150. Carried upon the upper face of the diaphragm is a head 151 which is socketed to receive the lower end of a valve stem 152. It will now be seen that upon a rise of pressure in the space 153, below the diaphragm, the valve 141 will be raised against the force of the very light spring 145. The space 154 above the diaphragm 146 and below the valve 141 is connected by a duct 155 with the atmosphere. The space between the caps 150 and 148 and therefore the space 153 is connected by a duct $l$ with the port $k'''$.

Now when the parts are in release position, the chamber 153 on the under side of the diaphragm 146 will be connected to the atmosphere through the duct $l$, the port $k'''$, the cavity $e$, the duct $e''$, the cavity $e'''$ and the exhaust cavity $x$, the space on the other side of the leather seated valve being connected of course to the auxiliary reservoir by the duct $l'$.

When the slide valve is in service position as shown in Fig. 2, the passage $l$ will be connected through the cavity $e$, the cavity $e'$, the duct $e''$ and cavity $e'''$ with the passage $m$ leading to the chamber 28 and therefore to the train pipe or the brake pipe. Now upon an increase in brake pipe pressure to shift the slide valve to release position if the slide valve does not move, the pressure on the under side of diaphragm 146 will raise the valve 141 and the auxiliary reservoir air will be vented through the passage $l'$ to the atmosphere by the passage 155. This will decrease the pressure behind the triple piston valve coincidentally with the building up of pressure on the train line side of the piston or in front of it until the difference in pressures will cause a positive movement of the valve to release position. If the triple valve moves to release position as it should with the first rise of brake pipe pressure, the valve 141 will remain closed. If, however, the triple valve fails to move to release position on the first rise of brake pipe pressure, air will be free to pass to the chamber 153 and the pressure in this chamber will overcome the pressure in the auxiliary reservoir and its spring and the valve 141 will be moved from its seat and air will flow from the auxiliary reservoir to the atmosphere. It will be seen that at this time therefore there is rising pressure on the brake pipe side of the triple piston and a decreasing pressure or "blowing down" on the auxiliary side of the triple piston. This will absolutely cause a release of the triple piston, no matter what the defect may be that would tend to cause the triple piston to stay in service position while brake pipe pressure is rising.

Another feature of my invention is to provide a triple valve without the emergency feature which is common in all other standard triple valves known to me and to substitute a quick service instead of the emergency application.

In Fig. 18 I show the quick service position of the slide valve. In a quick service application a quick and heavy reduction of air is made at the engineer's valve which causes the slide valve 19 to be thrown to the left in Fig. 3 so far that the stud $9^a$ strikes the buffer 10 and compresses the spring 11. This movement of the valve carries it to the position shown in Fig. 18. It will be seen from Fig. 15 that when the slide valve is in service position, the cavity $a^5$ only slightly overlaps the cavity $a^4$ and that the cavity $c''$ only slightly overlaps the port $a$ of the cavity $a^4$ and only slightly overlaps the port $c$. Thus only a relatively small amount of air can pass from the auxiliary reservoir and from the brake cylinder pipe into the brake cylinder. When, however, a quick service reduction is made and the slide valve is carried to the position shown in Fig. 18, the cavity $a^5$ fully overlaps the cavity $a^4$, and the cavity $c''$ fully overlaps both the ports $a$ and $c$ so that a relatively large amount of air can pass from the auxiliary reservoir and train pipe to the brake cylinder. At the same time the slide valve has moved so far over toward the left in Fig. 3 that a port $n$ of a passage $n'$ is brought over the cavity $d'$. This passage $n$ at its outer end is in communication with the air in the auxiliary chamber 13 and the inner end of the passage turns downward to form the port $n'$. In normal or release position, this port $n'$ is blanked, and the same is true when the parts move to service position, but when the valve moves to quick service position, then the port $n$ overlapping the cavity $d$, auxiliary reservoir pressure is carried to the chamber 68 together with air from the storage chamber 87. This rapidly builds up the pressure in the chambers 68 and 85 so as to hold the valve 79 open and the valve 89 closed. The valve 79, of course, remains open until the pressures in the chambers 67 and 68 have equalized, whereupon the valve closes.

In order to connect the train pipe with the storage chamber 65 in release position, I provide the slide valve 19 with the port $o$, so that in the release position of the slide valve the auxiliary reservoir and the storage chamber are simultaneously charging, as shown in Fig. 13, air passing from the chamber 28 through the passage $m$ into the cavity $i$, through the passages $h'$ and $o'$ into the cavity $o$ and thence by the passage $f$ to the storage reservoir, and also passing from the passage $h'$ into the cavity $g$ in the graduating valve and from this cavity into the passage $h''$ leading to the auxiliary reservoir. In Fig. 15, it will be seen that at service position the port $o$ is blanked, thereby cutting off the connection between the train pipe and the storage chamber and trapping air therein, except when the train line pressure is above normal when the storage chamber will be in indirect communication with the train line through the valve device D+ and the valve device E.

From the foregoing description, it will be apparent that the brake cylinder pressure equalizing mechanism insures standard pressure in all brake cylinders, irrespective of the length of piston travel in the various cylinders or of leaks in the cylinders. This equalizing of pressure or bringing of pressure to normal in the brake cylinders is also accomplished irrespective of the train line pressure and amount of reduction of train line pressure, the mechanism operating for all train line reductions down to equalization of the air brake system. It will also be clear that the storage chamber 65 is vitally connected with the brake cylinder pressure equalizing mechanism in that its volume of air expanded from this chamber which controls, through the controlling chambers of the brake cylinder pressure equalizing mechanism, the air pressure which shall be admitted to the brake cylinders. In this connection, the pressure maintaining device F is also an important feature as it maintains the pressure in the storage chamber 65 and also in the auxiliary reservoir at the proper point, that is, at the pressure to which the train line has been reduced.

To the best of my knowledge, no device has previously been provided for controlling the supply of excess pressure to the brake cylinder and the mechanism which I provide for this purpose, namely, the device E, is of vast importance as it provides for a supply of excess pressure to the brake cylinders, if the train line pressure is raised above normal, over the pressure which would naturally be supplied at any given reduction. At the same time, there is an intimate correlation between this excess pressure brake cylinder control mechanism and the brake cylinder pressure equalizing mechanism in that the latter still insures the same pressure in all brake cylinders, being so arranged that when the excess pressure brake cylinder control mechanism is in operation, it is governed and controlled thereby to, in turn, govern and control the pressure in the brake cylinders.

When handling long trains, it is absolutely impossible, with ordinary air brake systems, to obtain a release of the brakes at the rear of the train unless a heavy train line reduction has been previously made. With my excess pressure brake cylinder control, it is possible to obtain sufficient brake cylinder pressure with a light reduction of the train line, if the train line has been previously built up above normal. However, with this device by itself, it would be impossible to release the brakes at the rear end of the train and to overcome this difficulty I provide the auxiliary reservoir venting device G. It will therefore be seen that the mechanism E will be of little value in the system without the auxiliary reservoir venting device G.

Another feature which should be particularly noted, is the fact that my triple valve provides for serial venting of the train line, both in service and quick service positions of the triple valve, the venting being more rapid in the quick service position of the valve. Furthermore, this serial venting of the train line discharges the air from the train line into the brake cylinder pressure equalizing mechanism and from this through the slide valve to the brake cylinders.

Having thus described my invention, what I claim as new is:—

1. In an air brake system, a train pipe, a brake cylinder, means for admitting predetermined volumes of air to the brake cylinder to obtain various predetermined pressures therein according to the braking power desired, and means operable after the admission of any one of the predetermined volumes of air to the cylinder for venting a portion of such air if the pressure in the cylinder is above normal for that predetermined volume admitted.

2. In an air brake system, a train pipe, a brake cylinder, means for admitting predetermined volumes of air to the brake cylinder to obtain various predetermined pressures therein according to the braking power desired, means after the admission of any one of the predetermined volumes of air to the cylinder for venting a portion of such air if the pressure in the cylinder is above normal for that predetermined volume admitted, and means for rendering such means inactive when an abnormally high train line pressure is employed.

3. In an air brake, the combination with a train pipe, an auxiliary reservoir, a brake cylinder, and means for admitting auxiliary reservoir pressure to the brake cylinder upon a reduction of pressure in the train pipe, of chambers, in the service position of said means containing fluid at a pressure equal to that in a brake cylinder having a standard piston travel, and means controlled by differences of pressure in said chambers and in the brake cylinder for admitting fluid from the train pipe to the brake cylinder if the pressure in the brake cylinder is below the standard, and for venting fluid from the brake cylinder if the pressure therein is above said standard.

4. Means for equalizing pressure in the brake cylinders of fluid pressure brakes comprising a valve controlling passage of fluid from a brake cylinder, and a diaphragm connected thereto, the diaphragm on one side at service position of the brakes being exposed to pressure equal to that in a brake cylinder of standard piston travel and on the other side being exposed to the pressure in the brake cylinder.

5. Means for equalizing pressure in the brake cylinders of fluid pressure brakes including a regulating chamber, a diaphragm subjected to the opposing pressures of the brake cylinders and said regulating chamber, and a valve carried by said diaphragm and adapted to establish communication between the brake cylinders and atmosphere when the brake cylinder pressure is greater than that of the storage chamber and disestablish communication when the brake cylinder pressure is less.

6. Means for equalizing pressure in the brake cylinders of fluid pressure brakes including a regulating chamber, a diaphragm subject to the opposing pressures of the brake cylinders and said regulating chamber, and a valve controlled by the diaphragm and adapted to vent air from the brake cylinder when the brake cylinder pressure is greater than the pressure in the regulating chamber, said valve being adapted to close when the brake cylinder pressure is equal to that of the regulating chamber.

7. In an air brake, a brake cylinder and a train line, a slide valve, an auxiliary reservoir, means for controlling the admission of train line air to the brake cylinder and upon a movement of the slide valve to service position, said means including a valve and a diaphragm, one side of which is subjected to standard brake cylinder pressure urging the valve to open position and the other side of which is subjected to brake cylinder pressure urging the valve to closed position, and means for controlling the venting of excess pressure from the brake cylinder including a valve and a diaphragm, one side of which is subject to a standard brake cylinder pressure holding the valve closed and the other side of which is subject to back pressure from the brake cylinder, whereby upon a rise of brake cylinder pressure greater than the standard brake cylinder pressure the valve will open to vent said excess pressure from the brake cylinder.

8. In an air brake, a brake cylinder, a train line, a slide valve, an auxiliary reservoir, a storage chamber, means for controlling the admission of train line air to the brake cylinder upon a movement of the slide valve to service position including a valve and a diaphragm engaging therewith, said slide valve establishing communication between one side of the diaphragm and the atmosphere in release position and between the storage chamber and the same side of the diaphragm in service position, and establishing communication between the opposite side of the diaphragm and the brake cylinder in service position.

9. In an air brake, a brake cylinder, a train line, a slide valve, an auxiliary reservoir, a storage chamber, and means for controlling the admission of train line air to the brake cylinder upon a movement of the slide valve to service position and for controlling the venting of excess air from the brake cylinder in service position of the slide valve, said means including a pair of chambers each having therein a diaphragm and a valve controlled by the diaphragm, one of said valves when opened establishing communication between the train line and the brake cylinder and the other valve opening to the atmosphere, said slide valve at release position establishing communication between one side of both of said diaphragms and the atmosphere and at service position establishing communication between the storage chamber and the same side of said diaphragms and establishing communication between the opposite side of both of said diaphragms and the brake cylinder in service position of the slide valve.

10. In an air brake, a brake cylinder, a train line, a slide valve, an auxiliary reservoir, and a storage reservoir, means for controlling the admission of train line air to the brake cylinder upon a movement of the slide valve to service position, and means for controlling the venting of brake cylinder air in service position of the slide valve, said means including a pair of valve chambers, a diaphragm in each chamber, a valve in each chamber carried by the corresponding diaphragm, said slide valve in release position establishing communication between one side of both diaphragms and the atmosphere, and in service position establishing communication between the same side of both diaphragms and the storage reservoir, and also establishing communication between the opposite side of both diaphragms and the brake cylinder in service position, said slide valve in release position establishing communication between the train pipe and the storage chamber and cutting off said communication at service position.

11. In an air brake, a brake cylinder, a train line, a slide valve, a pressure controlled feed valve adapted when open to admit train line air to the brake cylinder and when closed to cut off passage of train line air thereto, and means for controlling the opening and closing of said valve, said means including a valve chamber, a diaphragm and a valve carried thereby, the valve side of said diaphragm being subjected to pressure from the train line when the slide valve is in service position, and the space on the opposite side of the diaphragm being connected to the pressure controlled feed valve whereby, when pressure in the valve side of the diaphragm overcomes pressure on the opposite side, the valve will open to cause train line air to flow into the feed valve chamber and to thus cause the feed valve to open and to permit train line air to flow to the brake cylinder.

12. In an air brake, a brake cylinder, a train pipe, a feed valve controlling the passage of air from the train pipe to the brake cylinder, a train pipe pressure operated means operable at all train pipe pressures for controlling the action of said feed valve, and means for cutting out said controlling means or cutting it in.

13. In an air brake, the combination with a triple slide valve, a brake cylinder, and a train pipe, of a diaphragm actuated feed valve adapted when the slide valve is in service position to open communication between the brake cylinder and the train pipe, and means actuated by pressure in the train pipe and connected with the train pipe upon a movement of the slide valve to service position for causing said feed valve to open until pressure in the brake cylinder has equalized with that in the train pipe.

14. In an air brake, a triple slide valve, a train pipe, a storage chamber, a feed valve opening when the slide valve is at service position to permit the passage of train pipe air to the brake cylinder and including a valve chamber, a diaphragm therein controlling said valve, and an excess brake cylinder pressure controlling valve including a chamber, a diaphragm therein, a spring urging the diaphragm in one direction, a valve carried by the diaphragm and held to its seat by the spring, the space above said diaphragm of the controlling valve chamber being operatively connected to the train pipe upon movement of the slide valve to service position, the valve seat of the controlling valve being operatively connected to the space behind the diaphragm of the feed valve when the slide valve is in service position, said valve seat being also connected to the space behind the diaphragm of the controlling valve whereby upon a movement of the slide valve to service position the controlling valve shall be opened by train pipe pressure to permit train pipe pressure to flow to the space behind the diaphragm of the feed valve to thereby cause said feed valve to open until the pressure behind the controlling valve diaphragm is equalized with the pressure in front of it.

15. In an air brake system, the combination with a train pipe, an auxiliary reservoir, and a brake cylinder, of a slide valve having ports adapted to establish a relatively restricted communication between the brake cylinder and the auxiliary reservoir and train pipe upon a movement of the slide valve to service position, said ports having such form as to create a larger area of communication upon a movement of the slide valve to quick service position.

16. In an air brake system, the combination with a train pipe, an auxiliary reservoir, and a brake cylinder, of a triple slide valve having ports adapted in service position of the slide valve to establish a relatively restricted connection between the brake cylinder and both the auxiliary reservoir and train pipe, said ports having such form as to create a large area of communication upon a further movement of the slide valve in the same direction to quick service position, a feed valve controlling communication between the train pipe and one of said ports, and means for shifting said feed valve to a full open position upon a movement of the slide valve to quick service position.

17. In an air brake system, the combination with a train pipe, an auxiliary reservoir, and a brake cylinder, of a triple slide valve having ports adapted to establish a relatively restricted communication between the brake cylinder and both the auxiliary reservoir and train pipe upon a movement of the slide valve to service position, said ports having such form as to create a large area of communication upon a movement of the slide valve to quick service position, equalizing valves, one controlling the feed of air from the train pipe to one of the ports in the slide valve, and the other adapted to vent excess pressure from the brake cylinder and the atmosphere, said slide valve being formed with a port adapted to cause the passage of train pipe air to said equalizing valves whereby to cause a relatively great opening of the feed valve when the slide valve moves to service position and to cause the vent valve to be held to its seat.

18. In an air brake, the combination with an auxiliary reservoir, of a slide valve, a graduating valve coacting therewith and a piston operating the slide and graduating valves, the space behind said piston at all times being operatively connected to the train pipe, and the slide valve and graduating valve being provided with ports and a cavity whereby to establish direct communication between the train pipe and the auxiliary reservoir through the ports of the slide valve and cavity of the graduating valve, when the slide valve and graduating valve are in release position.

19. In a triple valve, a piston, a slide valve, a graduating valve, and a storage reservoir, the slide valve and graduating valve acting in release position to establish communication between a train pipe, the storage reservoir and an auxiliary reservoir and in service position to cut-off said communication.

20. In an air brake, a train pipe, a slide valve, a brake cylinder, an auxiliary reservoir connected with the brake cylinder, a brake cylinder pressure controlling valve chamber, a diaphragm therein, a valve carried by the diaphragm and co-acting with a valve seat, the space on the valve side of said diaphragm being operatively connected to the train pipe upon a movement of the slide valve to service position, a pressure actuated valve controlling passage of train pipe air to the brake cylinder when train line pressure is above normal and including a diaphragm actuating said valve, an operative connection between the space behind said last-named diaphragm and the space behind the first-named diaphragm, and a duct connecting said valve seat with said last-named connection.

21. In an air brake, a train pipe, a slide valve, a brake cylinder, an auxiliary reservoir connected with the brake cylinder, a brake cylinder pressure controlling valve chamber, a diaphragm therein, a valve connected by the diaphragm and co-acting with a valve seat, the space on the valve side of said diaphragm being operatively connected to the train pipe upon a movement of the slide valve to service position, a pressure actuated valve controlling passage of train pipe air to the brake cylinder when the train line pressure is above normal and including a diaphragm actuating said valve, an operative connection between the space behind said last-named diaphragm and the space behind the first-named diaphragm, and a duct connecting said valve seat with said last-named connection, and a manually operable valve for closing communication between the first-named valve chamber and the second-named valve chamber.

22. In an air brake, a train line, a brake cylinder, means for supplying air to the brake cylinder in predetermined volumes, and means for venting air from the brake cylinder if pressure therein is above standard for the particular volume supplied.

23. In an air brake system, the combination with a train line, an auxiliary reservoir, a brake cylinder and a slide valve adapted, in service position, to supply air from the auxiliary reservoir to the brake cylinder in predetermined volumes, of means for venting air from the brake cylinder, if the pressure therein becomes higher than standard for the particular volume supplied.

24. In an air brake system, the combination with a train line, an auxiliary reservoir, a brake cylinder and a slide valve adapted, in service position, to supply air from the auxiliary reservoir to the brake cylinder in predetermined volumes, of means for venting air from the brake cylinder, if the pressure therein becomes higher than standard for the particular volume supplied, said means including a valve subject to opposed standard brake cylinder and actual brake cylinder pressures, whereby it will open if the actual brake cylinder pressure exceeds the standard.

25. In an air brake system, the combination with a train line, a brake cylinder, an auxiliary reservoir and a slide valve movable into service position upon reduction of train line pressure to admit a predetermined volume of air to pass from the auxiliary reservoir to the brake cylinder, such volume depending upon the amount of reduction of the train line, of means for venting excess air from the brake cylinder in case pressure therein is above standard for the particular volume supplied.

26. In an air brake system, the combination with a train line, a brake cylinder, an auxiliary reservoir and a slide valve movable into service position upon reduction of train line pressure to admit a predetermined volume of air to pass from the auxiliary reservoir to the brake cylinder, such volume depending upon the amount of reduction of the train line, of means for venting excess air from the brake cylinder in case pressure therein is above standard, said means including a valve chamber divided by a diaphragm and a valve carried by the diaphragm, the diaphragm, upon one side, being subjected to standard brake cylinder pressure for the corresponding train line reduction and upon the other side being exposed to the actual brake cylinder pressure.

27. In fluid pressure brakes, the combination with a brake cylinder, an auxiliary reservoir of predetermined capacity relative to the brake cylinder, and a triple valve adapted, in service position, to supply fluid to the brake cylinder from the reservoir, of a valve casing, fluid pressure balanced means dividing the casing into chambers, one of which communicates with the brake cylinder in service position of the triple valve, a storage chamber having the same relative capacity to the other chamber as the auxiliary reservoir has to the brake cylinder and communicating with such chamber when the triple valve is in service position, and a valve in the casing controlling atmospheric venting of the first chamber and opened by the fluid pressure balanced means when the pressure in the first chamber exceeds that in the second.

28. In fluid pressure brakes, the combination with a train line, a brake cylinder, an auxiliary reservoir of predetermined capacity relative to the brake cylinder, and a triple valve adapted, in service position, to supply fluid to the brake cylinder, of a valve casing, fluid pressure balanced means dividing the casing into chambers, one of which communicates with the brake cylinder in service position of the triple valve, a second valve casing, fluid pressure balanced means dividing the second casing into chambers which communicate with the chambers of the first casing, a storage chamber communicating with the other chamber of the first valve casing and consequently with one of the chambers of the second valve casing and having the same relative capacity to the chambers with which it communicates as the auxiliary reservoir has with the brake cylinder, a valve controlled by the fluid pressure balanced means of the first casing governing passage of air from the train line to the brake cylinder when the pressure in that chamber of said casing communicating with the brake cylinder becomes less than the pressure in that chamber of the same casing communicating with the storage chamber, and a valve in the second casing controlled by the fluid pressure balanced means of such casing and regulating venting of fluid from that chamber of the second casing communicating with the brake cylinder to the atmosphere when the pressure in such chamber becomes greater than the pressure in that chamber of the second casing communicating with the storage chamber.

29. In fluid pressure brakes, the combination with a train line, a brake cylinder, an auxiliary reservoir of predetermined capacity relative to the brake cylinder, and a triple valve adapted, in service position, to supply fluid to the brake cylinder, of a valve casing, fluid pressure balanced means dividing the casing into chambers, one of which communicates with the brake cylinder in service position of the triple valve, a second valve casing, fluid pressure balanced means dividing the second casing into chambers which communicate with the chambers of the first casing, a storage chamber communicating with the other chamber of the first valve casing and consequently with one of the chambers of the second valve casing and having the same relative capacity to the chambers with which it communicates as the auxiliary reservoir has with the brake cylinder, a valve controlled by the fluid pressure balanced means of the first casing governing passage of air from the train line to the brake cylinder when the pressure in that chamber of said casing communicating with the brake cylinder becomes less than the pressure in that chamber of the same casing communicating with the storage chamber, a valve in the second casing controlled by the fluid pressure balanced means of such casing and regulating venting of fluid from that chamber of the second casing communicating with the brake cylinder to the atmosphere when the pressure in such chamber becomes greater than the pressure in that chamber of the second casing communicating with the storage chamber, and means for maintaining pressure in the storage chamber when the triple valve is in lap position.

30. In fluid pressure brakes, the combination with a train line, a brake cylinder, an auxiliary reservoir, of predetermined capacity relative to the brake cylinder, and a triple valve adapted, in service position, to supply fluid to the brake cylinder, of a valve casing, fluid pressure balanced means dividing the casing into chambers, one of which communicates with the brake cylinder in service position of the triple valve, a second valve casing, fluid pressure balanced means dividing the second casing into chambers which communicate with the chambers of the first casing, a storage chamber communicating with the other chamber of the first valve casing and consequently with one of the chambers of the second valve casing and having the same relative capacity to the chambers with which it communicates as the auxiliary reservoir has with the brake cylinder, a valve controlled by the fluid pressure balanced means of the first casing governing passage of air from the train line to the brake cylinder when the pressure in that chamber of said casing communicating with the brake cylinder becomes less than the pressure in that chamber of the same casing communicating with the storage chamber, a valve in the second casing controlled by the fluid pressure balanced means of such casing and regulating venting of fluid from that chamber of the second casing communicating with the brake cylinder to the atmosphere when the pressure in such chamber becomes greater than the pressure in that chamber of the second casing communicating with the storage chamber, and means for maintaining pressure in the storage chamber when the triple valve is in lap position, said means including a valve chamber, a perforated diaphragm therein, and a double valve carried by the diaphragm, the space on one side of the diaphragm being operatively connected to the storage chamber and the space on the other side of the diaphragm being operatively connected to the train line.

31. In fluid pressure brakes, the combination with a brake cylinder, an auxiliary reservoir of predetermined capacity relative to the brake cylinder, and a triple valve adapted, in service position, to supply fluid to the brake cylinder from the reservoir, of a valve casing, fluid pressure balanced means dividing the casing into chambers, one of which communicates with the brake cylinder in service position of the triple valve, a storage chamber having the same relative capacity to the other chamber as the auxiliary reservoir has to the brake cylinder and communicating with such chamber when the triple valve is in service position, a valve in the casing controlling atmospheric venting of the first chamber and opened by the fluid pressure balanced means when the pressure in the first chamber exceeds that in the second, and means for maintaining pressure in the storage chamber with the triple valve in lap position including a valve chamber, a perforated diaphragm therein, and a double valve carried by the diaphragm, the space on one side of the diaphragm being operatively connected to the storage chamber and the space on the other side of the diaphragm being operatively connected to the train line, the valves controlling flow of fluid from the storage chamber and from the train line to such spaces.

32. In fluid pressure brakes, the combination with a train line, a brake cylinder, an auxiliary reservoir, and a triple valve supplying fluid from the auxiliary reservoir to the brake cylinder in proportion to venting of the train line, of valves adapted to supply fluid from the train line to the brake cylinder if pressure in the brake cylinder is below normal for the reduction made and to vent fluid from the brake cylinder if the pressure in the brake cylinder is above normal for the reduction made, and a storage chamber, the pressures in the storage chamber and brake cylinder governing the operation of such valves.

33. In fluid pressure brakes, the combination with a train line, a brake cylinder, an auxiliary reservoir, and a triple valve supplying fluid from the auxiliary reservoir to the brake cylinder in proportion to venting of the train line, of valves adapted to supply fluid from the train line to the brake cylinder if pressure in the brake cylinder is below normal for the reduction made and to vent fluid from the brake cylinder if the pressure in the brake cylinder is above normal for the reduction made, and a storage chamber, the pressures in the storage chamber and brake cylinder governing the operation of such valves, the fluid in the storage chamber being vented in proportion to the volume of fluid passing from the auxiliary reservoir to the brake cylinder.

34. In fluid pressure brakes, the combination with a train line, a brake cylinder, an auxiliary reservoir, and a triple valve controlling supply of fluid from the auxiliary reservoir to the brake cylinder in proportion to the venting of the train line, of means for venting fluid from the brake cylinder if the pressure therein is too great for the train line reduction made, and additional means for supplying fluid to the brake cylinder from the train line in excess of that supplied from the auxiliary reservoir, said venting means and additional supplying means being so related that the former is rendered inactive when the latter is active.

35. In fluid pressure brakes, the combination with a train line, a brake cylinder, an auxiliary reservoir, and a triple valve controlling supply of fluid from the auxiliary reservoir to the brake cylinder in proportion to the venting of the train line, of means for venting fluid from the brake cylinder if the pressure therein is too great for the train line reduction made, and additional means active only when the train line pressure is above normal for supplying fluid to the brake cylinder from the train line in excess of that supplied from the auxiliary reservoir, said venting means and additional supplying means being so related that the former is rendered inactive when the latter is active.

36. In fluid pressure brakes, the combination with a train line, a brake cylinder, an auxiliary reservoir, and a triple valve controlling supply of fluid from the auxiliary reservoir to the brake cylinder in proportion to the venting of the train line, of means for venting fluid from the brake cylinder if the pressure therein is too great for the train line reduction made, and additional means for supplying fluid to the brake cylinder from the train line in excess of that supplied from the auxiliary reservoir, said venting means and additional supplying means being so related that the former is rendered inactive when the latter is active, whereby the amount of fluid supplied to the brake cylinder from the train line is dependent upon the excess in train line pressure above normal.

37. In fluid pressure brakes, the combination with a train line, a brake cylinder, an auxiliary reservoir, and a triple valve controlling supply of fluid from the auxiliary reservoir to the brake cylinder in proportion to the venting of the train line, of means for venting fluid from the brake cylinder if the pressure therein is too great for the train line reduction made, and additional means for supplying fluid to the brake cylinder from the train line in excess of that supplied from the auxiliary reservoir, said venting means and additional supplying means being so related that the former is rendered inactive when the latter is active, whereby the amount of fluid supplied to the brake cylinder from the train line is dependent upon the excess in train line pressure above normal, being greater the smaller the reduction made at any given train line pressure.

38. In fluid pressure brakes, the combination with a train line, a brake cylinder, an auxiliary reservoir, and a triple valve controlling supply of fluid from the auxiliary reservoir to the brake cylinder in proportion to the venting of the train line, of means for venting fluid from the brake cylinder if the pressure therein is too great for the train line reduction made, and additional means for supplying fluid to the brake cylinder from the train line in excess of that supplied from the auxiliary reservoir, said venting means and additional supplying means being so related that the former is rendered inactive when the latter is active, whereby the amount of fluid supplied to the brake cylinder from the train line is dependent upon the excess train line pressure, being greater the smaller the reduction made at any given train line pressure, and means operable upon building up of the train line to cause atmospheric venting of the auxiliary reservoir to move the triple valve to release position.

39. In fluid pressure brakes, the combination with a train line, a brake cylinder, an auxiliary reservoir, and a triple valve controlling supply of fluid from the auxiliary reservoir to the brake cylinder in proportion to the venting of the train line, of means for venting fluid from the brake cylinder if the pressure therein is too great for the train line reduction made, and additional means for supplying fluid to the brake cylinder from the train line in excess of that supplied from the auxiliary reservoir, said venting means and additional supplying means being so related that the former is rendered inactive when the latter is active, whereby the amount of fluid supplied to the brake cylinder from the train line is dependent upon the excess train line pressure, being greater the smaller the reduction made at any given train line pressure, and means operable upon building up of the train line to cause atmospheric venting of the auxiliary reservoir to move the triple valve to release position, said means including a casing divided into pressure chambers, one communicating with the auxiliary reservoir and the other with the train line, and a valve adapted, when pressure in the latter chamber is in excess of that in the former chamber, for opening the former chamber to the atmosphere.

40. In fluid pressure brakes, the combination with a train line, a brake cylinder, an auxiliary reservoir, and a triple valve adapted to supply fluid from the auxiliary reservoir to the brake cylinder in proportion to venting of the train line and to establish communication between the brake cylinder and atmosphere upon subsequent building up of the train line, of means for venting fluid from the brake cylinder if the pressure therein is too great for the particular train line reduction made and for supplying fluid from the train line to the brake cylinder if the pressure therein is too low for the train line reduction made, and coöperating means for causing supply of fluid to the brake cylinder in excess of that supplied by the train line reduction, said coöperating means being so related with the means for venting excess pressure from and supplying fluid to the brake cylinder that any venting is prohibited when the latter is active.

41. In fluid pressure brakes, the combination with a train line, a brake cylinder, an auxiliary reservoir, and a triple valve adapted to supply fluid from the auxiliary reservoir to the brake cylinder in proportion to venting of the train line and to establish communication between the brake cylinder and atmosphere upon subsequent building up of the train line, of means for venting fluid from the brake cylinder if the pressure therein is too great for the particular train line reduction made and for supplying fluid from the train line to the brake cylinder if the pressure therein is too low for the train line reduction made, and coöperating means for causing supply of fluid to the brake cylinder in excess of that supplied by the train line reduction, said coöperating means being so related with the means for venting excess pressure from and supplying fluid to the brake cylinder that any venting is prohibited when the latter is active, and means operable upon building up of train line pressure for venting the auxiliary reservoir to the atmosphere.

42. In fluid pressure brakes, the combination with a train line, a brake cylinder, an auxiliary reservoir, and a triple valve adapted, in service position, to supply fluid to the brake cylinder in proportion to the venting of the train line and in release position to vent the brake cylinder to the atmosphere, of valves adapted to supply fluid to the brake cylinder if pressure therein is below normal for train line reduction made and to vent fluid therefrom if pressure therein is above normal for the particular train line reduction made, a storage chamber adapted to be vented in proportion to the volume of air supplied to the brake cylinder from the auxiliary reservoir, the relative pressures in the brake cylinder and storage chamber controlling such valves, and means coöperating with the valves for causing supply of fluid to the brake cylinder in excess of that supplied by the train line reduction, said means and valves being so related that when the means is active the venting valve is held closed.

43. In fluid pressure brakes, the combination with a train line, a brake cylinder, an auxiliary reservoir, and a triple valve adapted, in service position, to supply fluid to the brake cylinder in proportion to the venting of the train line and in release position to vent the brake cylinder to the atmosphere, of valves adapted to supply fluid to the brake cylinder if pressure therein is below normal for train line reduction made and to vent fluid therefrom if pressure therein is above normal for the particular train line reduction made, a storage chamber adapted to be vented in proportion to the volume of air supplied to the brake cylinder from the auxiliary reservoir, the relative pressures in the brake cylinder and storage chamber controlling such valves, and means coöperating with the valves for causing supply of fluid to the brake cylinder in excess of that supplied by the train line reduction, said means and valves being so related that when the means is active the venting valve is held closed, and means for maintaining the pressure in the storage chamber when the triple valve is in lap position.

44. In fluid pressure brakes, the combination with a train line, a brake cylinder, an auxiliary reservoir, and a triple valve adapted, in service position, to supply fluid to the brake cylinder in proportion to the venting of the train line and in release position to vent the brake cylinder to the atmosphere, of valves adapted to supply fluid to the brake cylinder if pressure therein is below normal for train line reduction made and to vent fluid therefrom if pressure therein is above normal for the particular train line reduction made, a storage chamber adapted to be vented in proportion to the volume of air supplied to the brake cylinder from the auxiliary reservoir, the relative pressures in the brake cylinder and storage chamber controlling such valves, and additional means for causing supply of fluid to the brake cylinder in excess of that supplied by the train line reduction, said means and valves being so related that when the means is active the venting valve is held closed, means for maintaining the pressure in the storage chamber when the triple valve is in lap position, and means for venting the auxiliary reservoir to the atmosphere upon building up of train line pressure.

In testimony whereof I affix my signature in presence of two witnesses.

WILLIS C. WEBSTER. [L. s.]

Witnesses:
 J. K. MOORE,
 FREDERIC B. WRIGHT.